(12) United States Patent  
Chen

(10) Patent No.: US 6,388,875 B1
(45) Date of Patent: May 14, 2002

(54) RETAINING DEVICE OF COMPUTER DATA STORAGE DEVICE

(75) Inventor: Chia Hua Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/439,316

(22) Filed: Nov. 12, 1999

(30) Foreign Application Priority Data

Sep. 17, 1999 (TW) ..................................... 88215996 U

(51) Int. Cl.[7] ................................................ G06F 1/16
(52) U.S. Cl. ...................... 361/685; 361/679; 361/680; 361/681; 361/682; 361/683; 361/684; 361/685; 361/724; 361/725; 361/726; 361/727; 312/223.1; 312/223.2; 312/333; 312/334.16; 312/334.36; 439/354; 439/377
(58) Field of Search ...................... 361/683, 685, 361/679, 680, 681, 682, 684, 724, 725, 726, 727; 312/223.1, 223.2, 333, 334.16, 334.36; 439/354, 377

(56) References Cited

U.S. PATENT DOCUMENTS 5,332,306 A * 7/1994 Babb et al. ............ 312/334.16
5,398,157 A * 3/1995 Paul ........................... 361/684

\* cited by examiner

Primary Examiner—Leo P. Picard
Assistant Examiner—Yean-Hsi Chang
(74) Attorney, Agent, or Firm—Wei Te Chung

(57) ABSTRACT

A retaining device is mounted to a computer data storage device for supporting and retaining the data storage device in an enclosure comprised of opposite side walls. The retaining device includes an elongate body having a first face and an opposite face. Two sets of pins extend from the first face, each set including at least one pin interferentially engaging with a corresponding hole defined in the data storage device thereby attaching the retaining device thereto. The retaining device is slidably inserted into a channel defined in the corresponding side wall of the enclosure with the second face thereof confronting the side wall. A pair of spaced resilient limbs is formed on an end of the body. A leaf spring is arranged between the limbs for biasing projections formed on the limbs to engage with notches defined in the enclosure thereby securely retaining the data storage device in the enclosure. An auxiliary retaining member is selectively attached to the body including a base received in a recess defined in the second face and a pin extending from the base through a hole defined in the body for additionally engaging with a hole defined in the data storage device whereby the retaining device may be selectively attached to data storage devices of different sizes.

15 Claims, 6 Drawing Sheets

RETAINING DEVICE OF COMPUTER DATA STORAGE DEVICE

BACKGROUND OF THE INVENTION

1. Field of the Invention

The present invention generally relates to a computer data storage device, and in particular to a device for retaining and supporting a computer data storage device in a computer enclosure.

2. The Prior Art

A personal computer comprises data storage devices for storage of data. Data storage devices of a personal computer include, but not limited to, hard disk drive, floppy disk drive and CD-ROM. These data storage devices comprise a rigid casing that is retained in a computer enclosure by means of bolts. Tightening/loosening bolts to mount/dismount the data storage device is a time-consuming and laborious job.

A data storage device comprising side rails fixed on opposite sides thereof for sliding along corresponding guiding channel formed in a computer enclosure simplifies mounting/dismounting the data storage device to/from the computer enclosure. An example is disclosed in Taiwan Patent Application No. 78201813. However, bolts are still required for fixing the side rails to the rigid casing of a data storage device. Similar examples are disclosed in Taiwan Patent No. 79209891 and U.S. Pat. No. 5,332,306 that further comprises manually operating retaining pawls for retaining the data storage device in the enclosure.

U.S. Pat. No. 5,599,080 discloses a computer data storage device comprising side rails having stamped projections for resiliently engaging with corresponding notches defined in the casing of the data storage device for attaching the side rails to the casing. The resilient engagement, however, is not sufficient to firmly and effectively maintain the rails on the casing.

It is thus desired to provide a computer enclosure that overcomes the problems discussed above.

SUMMARY OF THE INVENTION

Accordingly, an object of the present invention is to provide a device for efficiently and effectively retaining a data storage device in a computer enclosure.

Another object of the present invention is to provide a device for amounting a data storage device to a computer enclosure without using bolts.

A further object of the present invention is to provide a device capable of selectively mounting data storage devices of different sizes to a computer enclosure.

To achieve the above objects, a retaining device for supporting and retaining a computer data storage device in an enclosure in accordance with the present invention comprises an elongate body having a first face and an opposite face. Two sets of pins extend from the first face, each set comprising at least one pin interferentially engaging with a corresponding hole defined in the data storage device thereby attaching the retaining device thereto. The retaining device is slidably inserted into a channel defined in a corresponding side wall of the enclosure with the second face thereof confronting the side wall. A pair of spaced resilient limbs is formed on an end of the body. A leaf spring is arranged between the limbs for biasing projections formed on the limbs to engage with notches defined in the enclosure thereby securely retaining the data storage device in the enclosure. An auxiliary retaining member is selectively attached to the body comprising a base received in a recess defined in the second face and a pin extending from the base through a hole defined in the body for additionally engaging with a hole defined in the data storage device whereby the retaining device may be selectively attached to data storage devices of different sizes.

BRIEF DESCRIPTION OF THE DRAWINGS

The present invention will be apparent to those skilled in the art by reading the following description of preferred embodiments thereof, with reference to the accompanying drawings, in which.

DETAILED DESCRIPTION OF THE PREFERRED EMBODIMENTS

Figure 3:
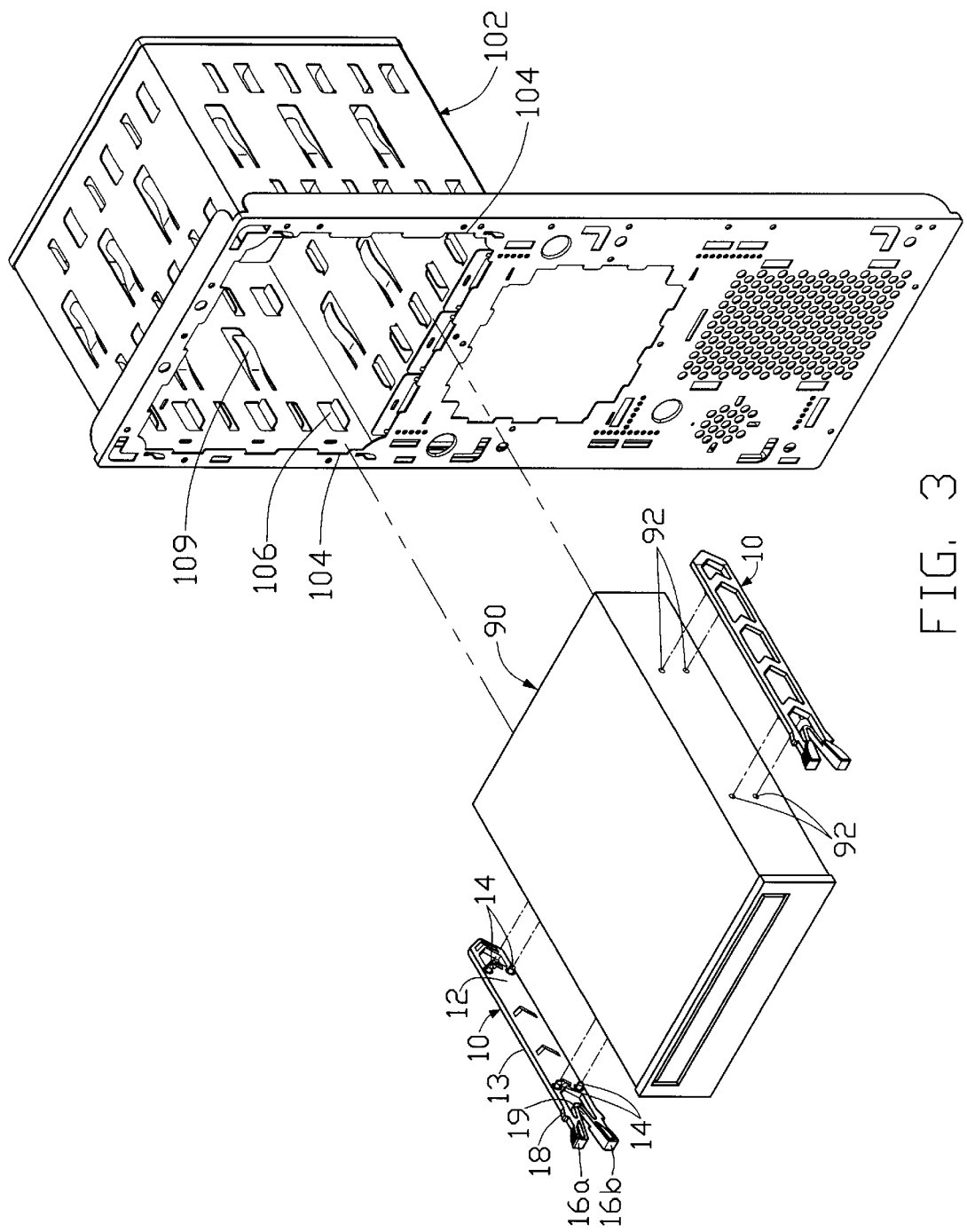
FIG. 3 is a perspective view of a computer data storage device to which the retaining devices of the present invention are attached for retaining the data storage device in an enclosure.
Figure 4:
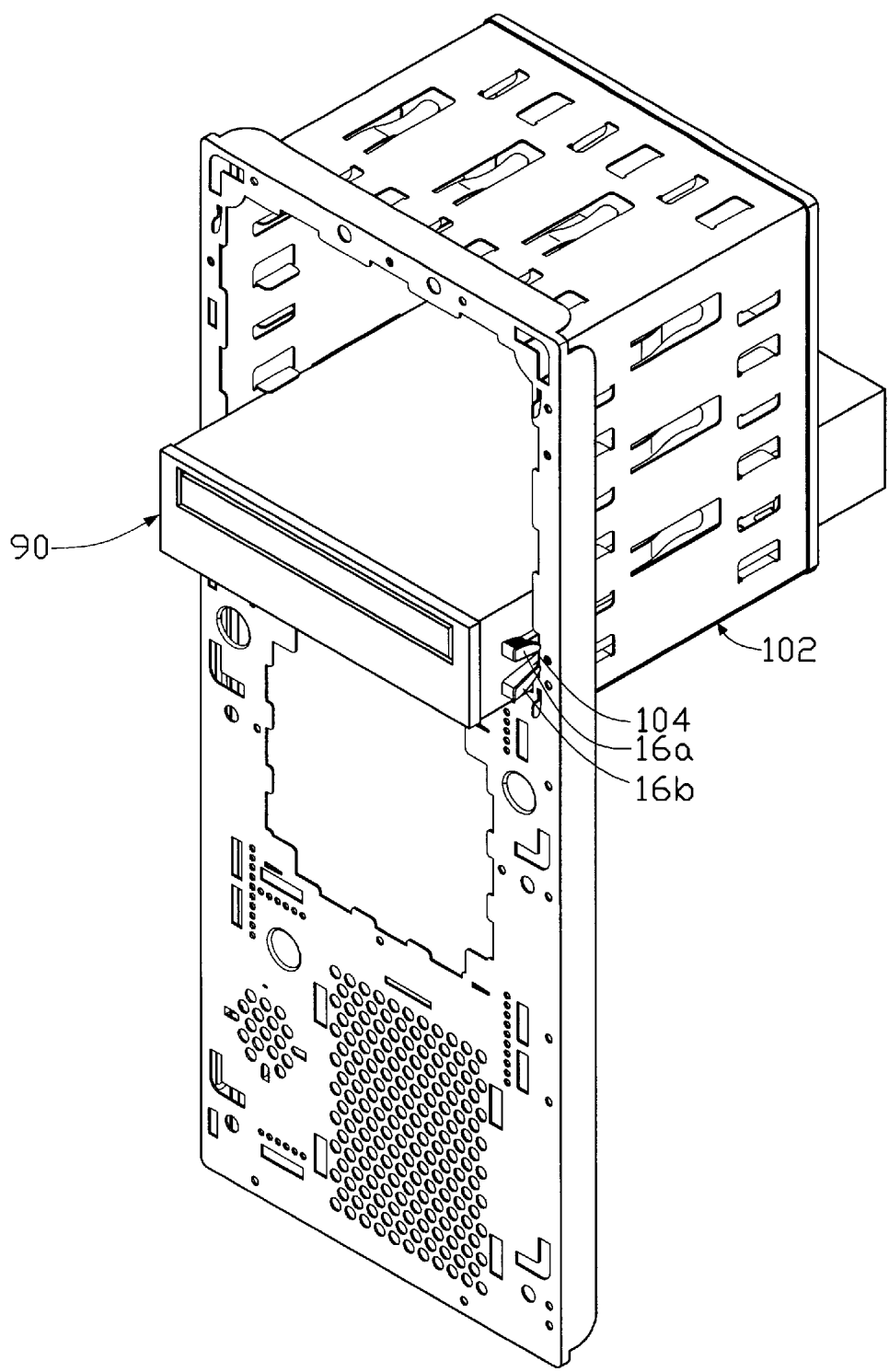
FIG. 4 is an assembled view of FIG. 3.

Referring to the drawings and in particular to FIGS. 3 and 4, a computer enclosure comprises at least a front panel (not labeled) to which a disk drive cage 102 is fixed for receiving at least a data storage device, such as an optic disk drive, for example a compact disc read only memory (CD-ROM) 90. The CD-ROM 90 is guided into and retained in the disk drive cage 102 by means of retaining devices, designated by reference numeral 10, constructed in accordance with the present invention. The retaining devices 10 are attached to opposite lateral surfaces of the CD-ROM 90 to be slidably engageable with sliding channels 106 defined in opposite side walls of the disk drive cage 102 and supported thereby.

Figure 1:
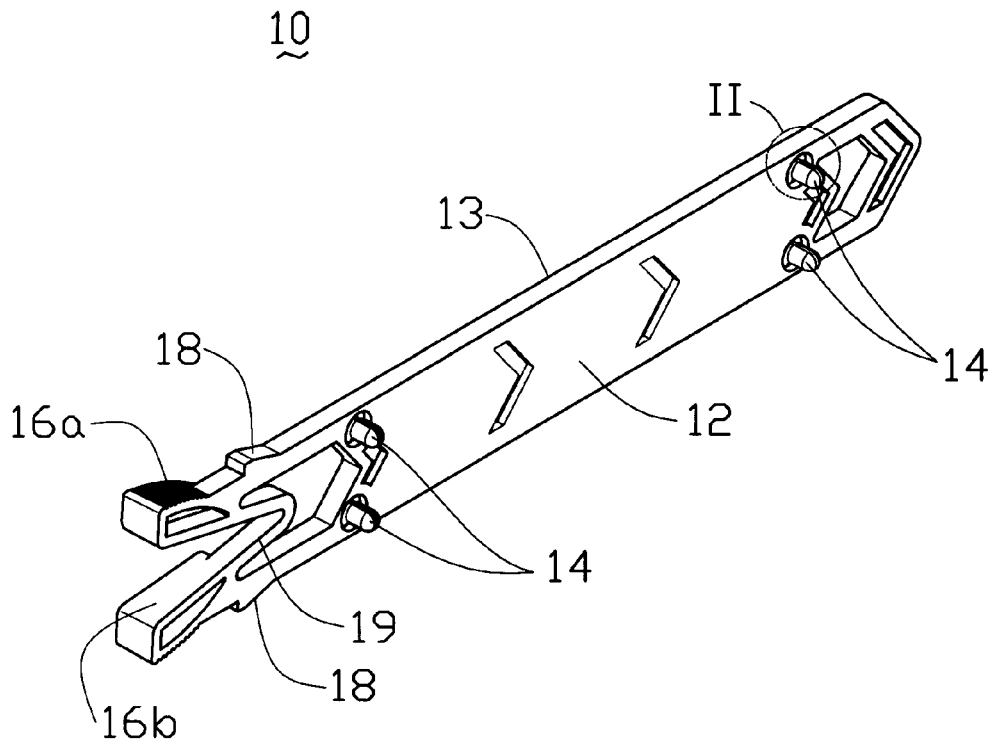
FIG. 1 is a perspective view of a retaining device for retaining a computer data storage device in an enclosure in accordance with a first embodiment of the present invention.
Figure 2:
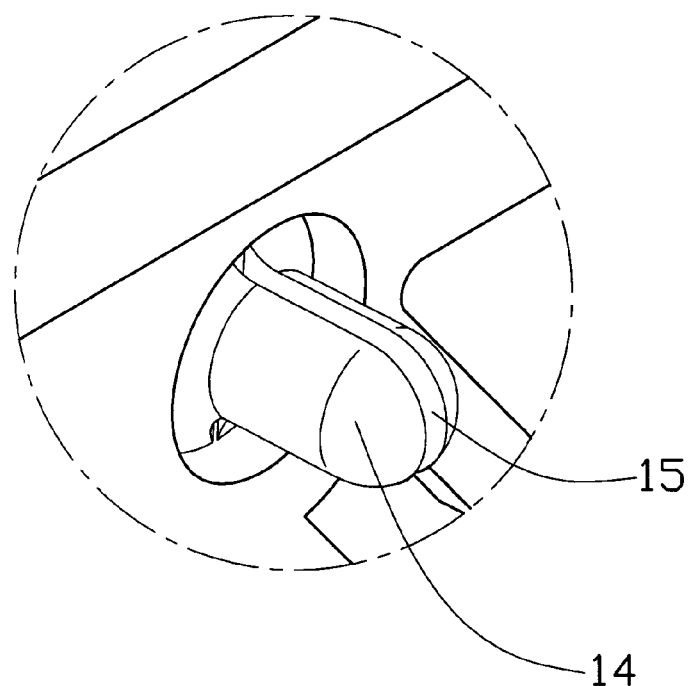
FIG. 2 is an enlarged view of encircled portion II of FIG. 1.

Also referring to FIGS. 1 and 2, each retaining device 10 comprises an elongate body (not labeled) having a first face 12 and an opposite second face 13. Two pairs of pins 14 are integrally formed with and extend from the first face 12 of the retaining device 10. Preferably, the pins 14 are substantially perpendicular to the first face 12. Each pin 14 defines a central slit 15, preferably diametrically extended, for providing resiliency of the pin 14. Corresponding to the pins 14, each lateral surface of the CD-ROM 90 defines holes 92 for receiving and interferentially engaging with the pins 14 thereby attaching the retaining device 10 to the CD-ROM 90. The slit 15 defined in each pin 14 allows the pin 14 to elastically deform in engaging with the corresponding hole 92. Preferably, each pin 14 has a rounded free end (not labeled) for facilitating insertion of the pin 14 into the corresponding hole 92. The retaining devices 10 mounted to lateral surfaces of the CD-ROM 90 may then be inserted into the corresponding sliding channels 106 of the disk drive cage 102 with the second faces 13 thereof confronting the corresponding side walls of the disk drive cage 102 thereby supporting the CD-ROM 90 in the disk drive cage 102.

For facilitating insertion of the retaining devices 10 into the corresponding sliding channels 106, the body of each retaining device 10 forms a tapering inner end. A bifurcation is formed on an outer end of the body of each retaining device 10, comprising two spaced resilient limbs 16a, 16b. Projections 18 are formed on outer edges of the limbs 16a, 16b for engaging with corresponding notches 104 defined in the disk drive cage 102 thereby effectively retaining the CD-ROM 90 in the disk drive cage 102. The resiliency of the limbs 16a, 16b serves as biasing means for securely engaging the projections 18 with the notches 104. Preferably, additional biasing means, such as leaf spring 19, is arranged between the limbs 16a, 16b for more securely engaging the projections 18 with the notches 104. The leaf spring 19 may be a separate part or preferably and as shown in the drawings, forms an integrated portion of the body of the retaining device 10. The resiliency of the limbs 16a, 16b allows manual depression for disengaging the projections 18 from the notches 102 thereby releasing the CD-ROM 90 from the disk drive cage 102.

For facilitating engagement of the projections 18 with the corresponding notches 104, the projections 18 forms inclined faces (not labeled) which cammingly contact edges of the notches 104 for guiding the projections 18 into the notches 104.

Resilient tabs 109 may be formed in the disk drive cage 102 for resiliently engaging the CD-ROM 90 thereby more securely and firmly retaining the CD-ROM 90 in the disk drive cage 102.

Figure 5:
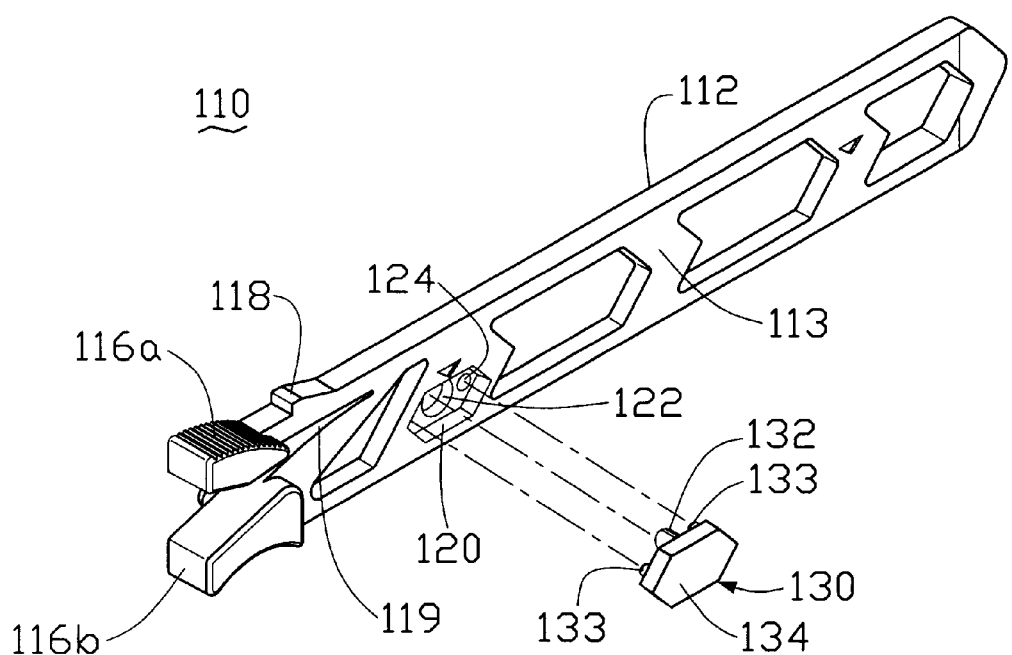
FIG. 5 is a perspective view of a retaining device in accordance with a second embodiment of the present invention.
Figure 6:
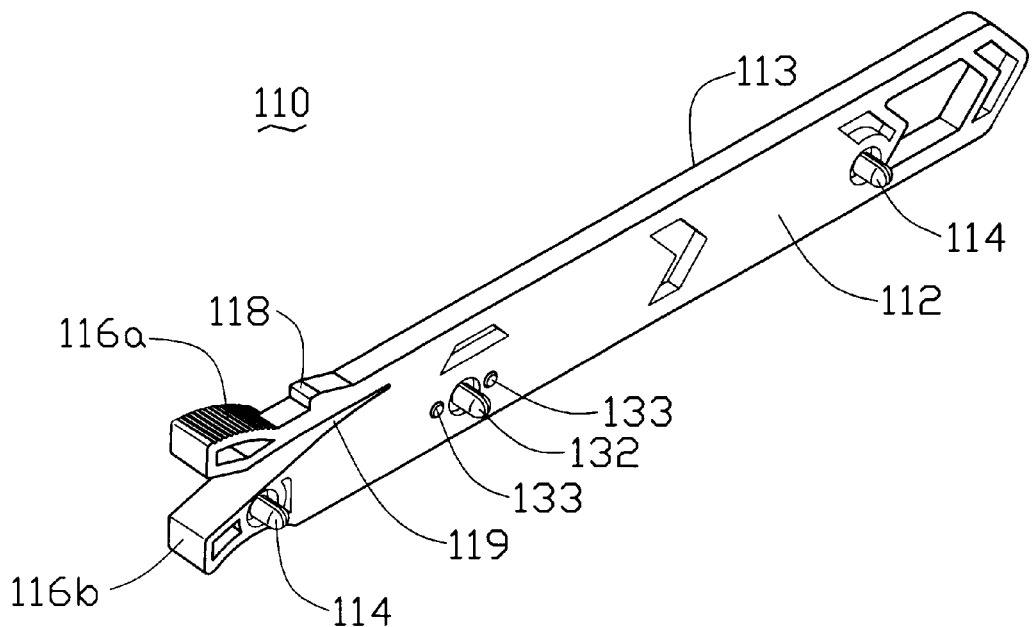
FIG. 6 is another perspective view of the retaining device of the second embodiment.
Figure 7:
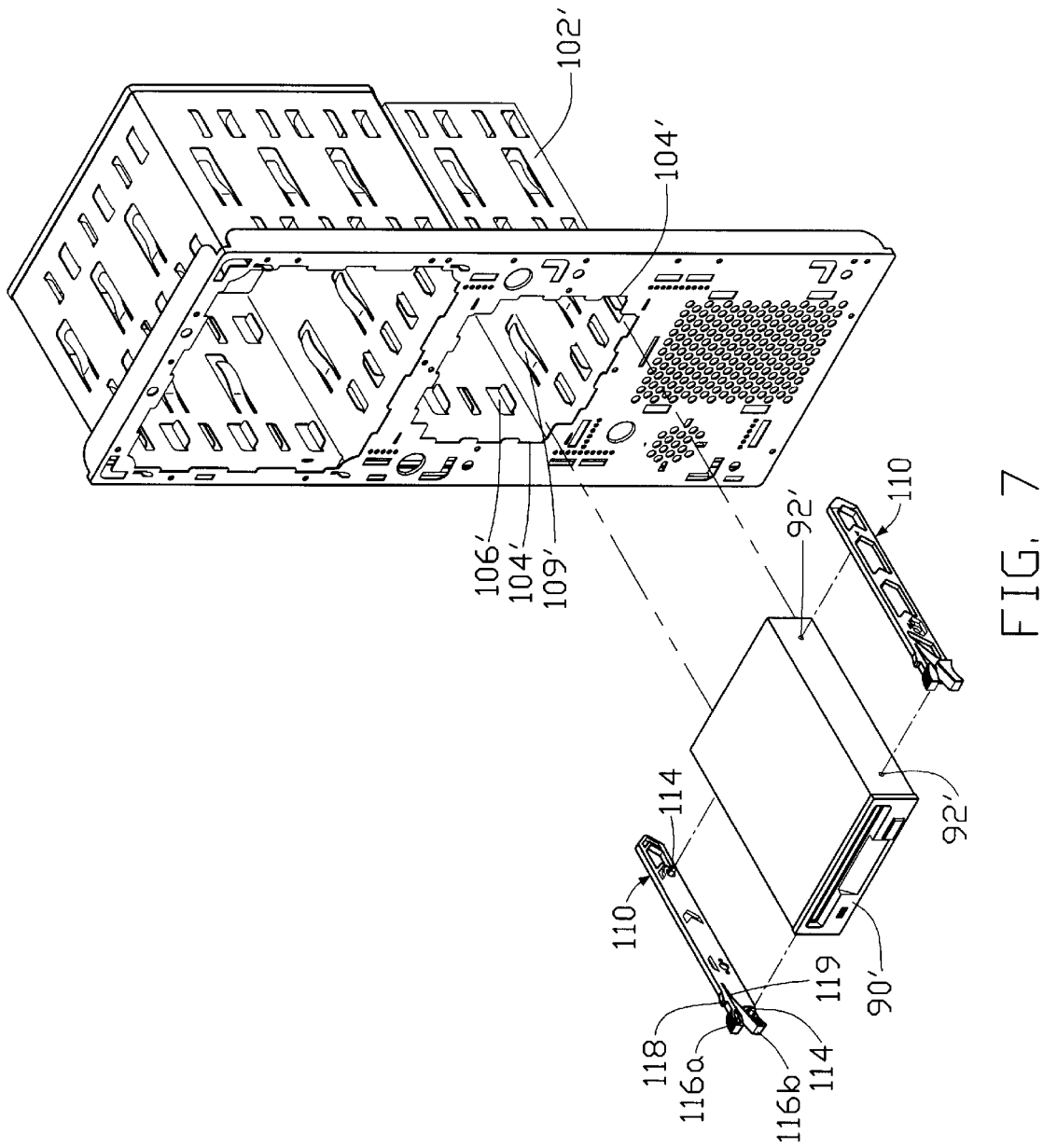
FIG. 7 is a perspective view of a computer data storage device to which the retaining devices of the second embodiment are attached for retaining the data storage device in an enclosure.

FIGS. 5 and 6 show a retaining device, designated at 110, in accordance with a second embodiment of the present invention. Parts of the retaining device 110 similar to those of the retaining device 10 with reference to FIGS. 1–4 are designated with same reference numeral with a prefix "1". The retaining device 110 has first and second faces 112, 113, a tapering inner end (not labeled) and a bifurcated outer end having two limbs 116a, 116b. Two pins 114 extend from the first face 112 for interferentially engaging with corresponding holes 92' defined in a corresponding lateral face of a data storage device, such as floppy disk drive 90' (FIG. 7), to attach the retaining device 110 to the floppy disk drive 90'.

It is noted that the number of the pins 114 is less than that of the pins 14 of the first embodiment. However, it is apparent that the number of the pins 114 or 14 may vary as desired.

In the second embodiment, one of the two pins 114 is formed on the limb 116b. To accommodate the pin 114, the limb 116b is enlarged whereby the limb 116b may not be so resilient as to be manually depressible. The other limb 116a, however, is kept resilient for being manually depressible. The limb 116b has an inclined, preferably curved, inner surface 119 from which the limb 116a directly extends forming an angle therebetween for resiliently biasing the limb 116a. A projection 118 is formed on the limb 116a whereby when the retaining device 110 is inserted into a corresponding sliding channel 106' defined in a disk drive cage 102' of a computer enclosure, the projection 118 is biased to engage with a notch 104' defined in the disk drive cage 102' for effectively retaining the floppy disk drive 90' in the disk drive cage 102'. No projection 118 is formed on the limb 116b in this case.

Resilient tabs 109' are formed in the disk drive cage 102' for resiliently engaging the floppy disk drive 90' thereby more securely and firmly retaining the floppy disk drive 90' in the disk drive cage 102'.

Figure 8:
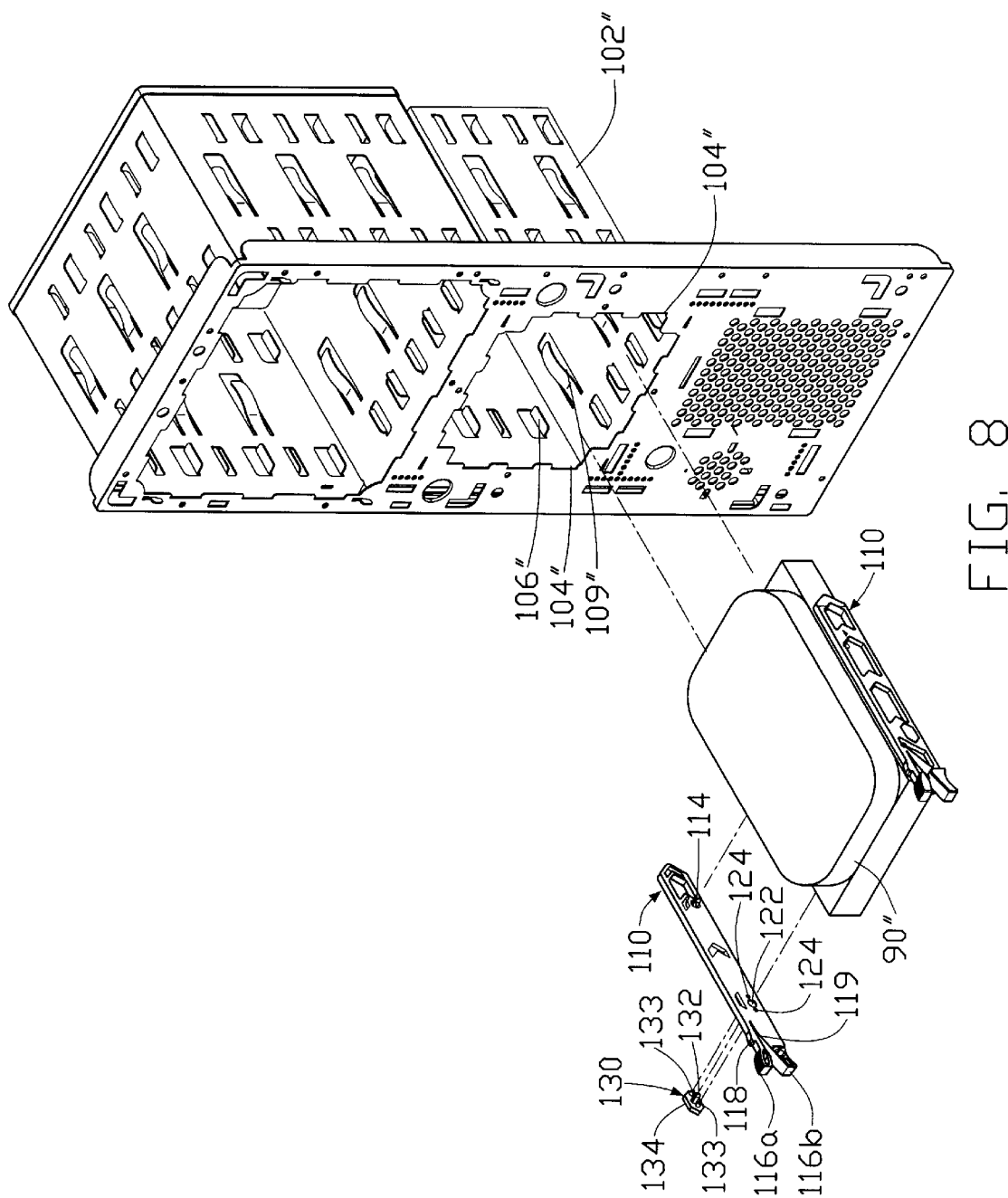
FIG. 8 is similar to FIG. 7 but showing the retaining devices are attached to a data storage device having a different size from that of FIG. 7.

Referring to FIGS. 5, 6 and 8, if desired to retain a hard disk drive 90" in a disk drive cage 102" of a computer enclosure, since the hard disk drive 90" is smaller than the floppy disk drive 90' thus the pin 114 formed on the limb 116b is offset from boundary of the hard disk drive 90" thereby not capable to engage with a corresponding hole defined in the hard disk drive 90". An auxiliary retaining member 130 is additionally mounted to each retaining device 110 to provide a further point of engagement between the retaining device 110 and the hard disk drive 90".

The auxiliary retaining member 130 comprises a base 134 from which a primary projection 132 and two secondary projections 133 extend. A recess 120 is defined in the second face 113 for snugly receiving the base 134 of the auxiliary retaining member 130. A primary hole 122 and two secondary holes 124 extend between the recess 120 and the first face 112 of the retaining device 110 for receiving the primary and secondary projections 132, 133 with the primary projection 132 extending beyond the first face 112 and the secondary projections 133 interferentially engaging with the secondary holes 124 for fixing the auxiliary retaining member 130 to the retaining device 110. The primary projection 132 of the auxiliary retaining member 130 and the pin 114 that is not formed on the limb 116b are engageable with corresponding holes (not shown) defined in the hard disk drive 90" for attaching the retaining device 110 to the hard disk drive 90". Mounting the hard disk drive 90" to the disk drive cage 102" may then be performed by inserting the retaining devices 110 into corresponding sliding channels 106" defined in the side walls of the disk drive cage 102" with the projections 118 engaging with notches 104" defined in the disk drive cage 102". Resilient tabs 109" formed in the disk drive cage 102" resiliently engage with the hard disk drive 90" thereby firmly retaining the hard disk drive 90" in the disk drive cage 102".

Although the present invention has been described with reference to the preferred embodiments, it is apparent to those skilled in the art that a variety of modifications and changes may be made without departing from the scope of the present invention which is intended to be defined by the appended claims.

What is claimed is:

1. A retaining device adapted to be mounted to a data storage device for supporting and retaining the data storage device in an enclosure having opposite side walls, the retaining device comprising an elongate body having a first face and an opposite face, two sets of pins extending from the first face, each set comprising at least one pin defining a slit diametrically extending therethrough to give the pin with resiliency, thereby facilitating interferential engagement of the pin with a corresponding hole defined in the data storage device, the body comprising a tapering inner end for facilitating insertion of the retaining device into a channel defined in the corresponding side wall of the enclosure so that the retaining device can be easily slidably inserted and received into the enclosure with the second face thereof confronting the side wall, the body further comprising releasable locking means opposing the tapering inner end of the body for engaging with counterpart means formed in the enclosure to retain the data storage device in the enclosure.

2. The retaining device as claimed in claim 1, wherein each pin forms a rounded free end for facilitating insertion of the pin into the corresponding hole of the data storage device.

3. The retaining device as claimed in claim 1, wherein each set comprises two pins.

4. The retaining device as claimed in claim 1, wherein the locking means comprises two spaced limbs formed on an end of the body, at least one limb being resilient for biasing a projection formed thereon to engage with the counterpart means of the enclosure.

5. The retaining device as claimed in claim 4, wherein both limbs are resilient and each has a projection formed thereon.

6. The retaining device as claimed in claim 5, wherein biasing means is arranged between the limbs for biasing the projections to engage the counterpart means.

7. The retaining device as claimed in claim 6, wherein the biasing means comprises a leaf spring.

8. The retaining device as claimed in claim 7, wherein the leaf spring is integrally formed with the body between the limbs.

9. The retaining device as claimed in claim 4, wherein each set comprises one pin, one of the pins of the retaining device being formed on a first one of the limbs.

10. The retaining device as claimed in claim 9, wherein the first limb is enlarged and thus substantially not resilient, the first limb having an inclined inner surface from which a second one of the limbs extends.

11. The retaining device as claimed in claim 1 further comprising an auxiliary retaining member selectively mounted to the body of the retaining device, the auxiliary retaining member comprising a primary projection extending through a receiving hole defined in the body and beyond the first face for engaging with an additional hole defined in the data storage device.

12. The retaining device as claimed in claim 11, wherein the auxiliary retaining member comprises a base from which the primary projection extends, the base being received in a recess defined in the second face of the body in communication with the receiving hole.

13. The retaining device as claimed in claim 12, wherein at least one secondary projection extends from the base for interferentially engaging with a bore defined in the body thereby fixing the auxiliary retaining member to the body.

14. The retaining device as claimed in claim 1, wherein counterpart means of the enclosure comprises a notch defined in the enclosure.

15. An assembly comprising:
a disk drive cage including two opposite first side walls defining sliding channels therein with notches formed around front ends of said sliding channels;
a data storage device including two opposite second side walls defining aligned holes in two second side walls; and
a retaining device including an elongated body with opposite first and second faces and attached to each of said two second side walls of the data storage device via pins which integrally extend inwardly from the first face and are interferentially received within the corresponding holes in the data storage device, said first face of the retaining device confronting the corresponding second side wall of the data storage device, said second face of the retaining device confronting the corresponding first side wall of the disk drive cage; wherein
said retaining device further includes locking means formed on a front end of the body and releasably engaged within the corresponding notch;
wherein
said retaining device extend in a front-to-back direction, said pin extends in a lateral direction perpendicular to said front-to-back direction, and said pin is shrinkable in a radial direction of said pin for interferential engagement within the corresponding hole.

* * * * *